A. STREAN.
Sleighs.

No. 153,862. Patented Aug. 4, 1874.

WITNESSES:

INVENTOR,
Alexander Strean
per: J. H. Alexander
ATTORNEY.

UNITED STATES PATENT OFFICE.

ALEXANDER STREAN, OF HARRODSBURG, INDIANA.

IMPROVEMENT IN SLEIGHS.

Specification forming part of Letters Patent No. 153,862, dated August 4, 1874; application filed February 4, 1874.

*To all whom it may concern:*

Be it known that I, ALEXANDER STREAN, of Harrodsburg, in the county of Monroe and State of Indiana, have invented certain new and useful Improvements in Hay-Loaders; and I do hereby declare that the following is a full, clear, and exact description thereof, reference being had to the accompanying drawings and to the letters of reference marked thereon, which form part of this specification.

My invention is intended as an improvement upon the hay-loader for which Letters Patent No. 127,116 were granted to me May 21, 1872; and it consists in the combination with a sled of an auxiliary frame and a series of teeth, all arranged substantially as hereinafter set forth, for loading and unloading an entire stack of hay.

In order to enable others skilled in the art to which my invention appertains to make and use the same, I will now proceed to describe its construction and operation, referring to the annexed drawing, in which—

Figure 1:
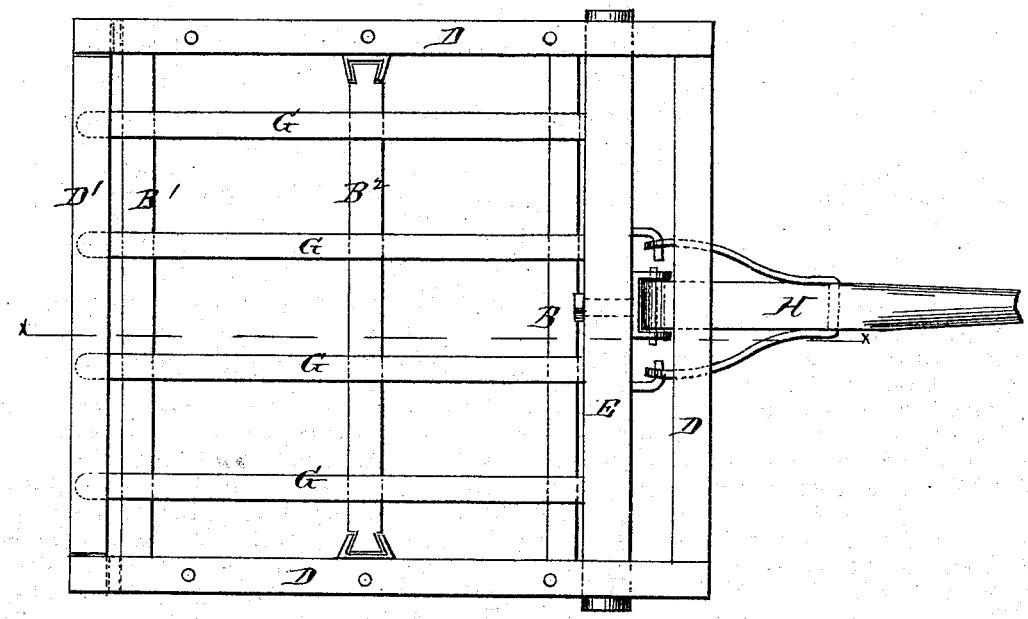
Figure 2:
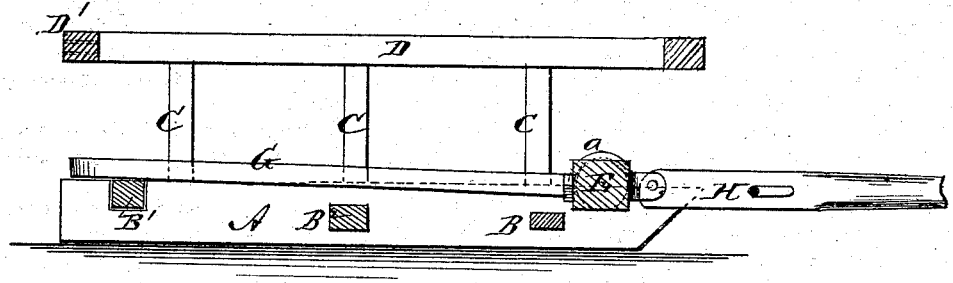

Figure 1 is a plan view, and Fig. 2 a longitudinal section, of my improved hay-loader.

A A represent two parallel runners placed a suitable distance apart and connected near their front ends by means of a stationary cross-bar, B. $B^1$ and $B^2$ represent two other cross-bars, connecting the runners—the former near the rear ends and the latter at or about the center—but these cross-bars are attached to the runners by dovetailed joints, so that they can be easily removed when necessary. Upon the runners A A are posts C C, of suitable height, connected by means of a square horizontal frame, D, the rear cross-bar $D'$ of which is removable at will. In boxes $a$ $a$ on top of the runners A, at their front ends, is placed a shaft, E, to the front side of which the tongue H is attached, and from the rear side of which projects a series of long teeth, G G, supported upon the cross-bars $B^1$ $B^2$.

The stack being built upon posts or rails, when it is to be moved the cross-bars $B^1$, $B^2$, and $D'$ are removed from their places and the machine backed up, the teeth G G passing under the stack and the side bars of the frame D passing one on each side thereof. By suitable means the teeth are now raised until the cross-bars $B^1$ $B^2$ can be inserted in their places. The cross-bar $D'$ is then inserted in its place, after which the props are knocked from under the stack, when it settles down upon the teeth G G, and is held in position by the frame D. The stack can now readily be moved to any desired place, where it is easily unloaded by simply raising the teeth G until the cross-bars $B^1$ $B^2$ can be removed, when the teeth, with the stack, settles down on the ground. The cross-bar $D'$ is then removed and the machine pulled forward, leaving the stack on the ground, or upon rails or other support previously prepared for it.

Having thus fully described my invention, what I claim as new, and desire to secure by Letters Patent, is—

The frame D, provided with movable cross-bars $D'$ $B^1$ $B^2$ and teeth G G, and mounted upon runners A A, all combined substantially as and for the purpose set forth.

In testimony that I claim the foregoing as my own I affix my signature in presence of two witnesses.

ALEXANDER STREAN.

Witnesses:
MICHAEL DECKARD,
MOSES COBB.